FREQUENCY DIVIDER FOR AN ELECTRONIC WATCH

Filed Feb. 5, 1969

INVENTORS
EUGENE R. KEELER
LEWIS B. SHRADY by

Davis, Hoxie, Faithfull & Hapgood
ATTORNEYS

United States Patent Office 3,564,837
Patented Feb. 23, 1971

3,564,837

FREQUENCY DIVIDER FOR AN ELECTRONIC WATCH

Eugene R. Keeler, Suffern, and Lewis B. Shrady, Irvington, N.Y., assignors to Timex Corporation, Waterbury, Conn., a corporation of Connecticut
Filed Feb. 5, 1969, Ser. No. 810,899
Int. Cl. G04c *3/00*
U.S. Cl. 58—23 3 Claims

ABSTRACT OF THE DISCLOSURE

A horological instrument includes an electric circuit which counts down from a high-frequency time base, such as a crystal oscillator. The count-down circuit includes at least three subcircuits having time periods which are relatively prime integers of each other, and an "and" circuit.

The present invention relates to horology and more particularly to a frequency dividing circuit utilized in an electronic watch.

There have been various proposals for incorporating a high-frequency time base in a portable watch, such as a wrist watch. It is known that a high-frequency time base such as a crystal oscillator or a high-frequency mechanical oscillator may be of high accuracy. They have been used in high-quality timing mechanisms such as large stationary clocks and telephone signal timing devices.

However, there have been formidable problems which have prevented the incorporation of such high-frequency time bases in a portable watch. One of the most serious of these problems is power consumption. A watch, by necessity, must be relatively small and may incorporate only a small battery cell. The amount of energy available from such a cell is limited. The energy from the cell must perform various functions in an electronic watch. For example, it must provide the current for the oscillations of the time base; the current for the dividing circuits to reduce the high frequency of the time base to a usable frequency; and the current for the time display means. Usually, the time display has been a set of hands rotated by gears in a conventional manner, although electroluminescent or other electro-optical light displays have also been suggested.

A conventional method of frequency reduction is to provide a series of bistable flip-flop stages in tandem, i.e., cascaded in series. Each flip-flop circuit reduces the frequency of its input by one-half with the output of one flip-flop being the input of the next flip-flop in the series. Three such bistable circuits, in series, would produce a frequency reduction of $2\times2\times2$, or a 8:1 frequency reduction ratio.

There have been various suggestions to reduce the energy required for frequency division. These suggestions have included the use of a tunnel diode in a dividing circuit. However, tunnel diodes operate at relatively high-power levels and may be subject to instability due to temperature variations.

It is the objective of the present invention to provide a frequency reducing circuit for an electronic watch, which circuit (1) is relatively low in power consumption, (2) utilizes components whose physical size is small so that they may fit within a watch, (3) may be produced by integrated circuit techniques at relatively low cost, and (4) utilizes relatively few components.

In accordance with the present invention a circuit is provided for the frequency reduction of a high-frequency time base in an electronic watch. For example, the time base may be a piezoelectric crystal oscillator. The output of the high-frequency time base, for example, at a frequency of 10,080 Hz., is reduced to a frequency of 48 Hz. by the circuit of the present invention. The lower frequency of 48 Hz. may be utilized to directly drive an electromechanical transducer which converts the electrical energy into mechanical motion to drive the hands of a watch; or to synchronize a motor which drives the hands of a watch; or to control an electroluminescent or other electro-optical type of time display.

The dividing (count-down) circuit of the present invention is provided by connecting at least three subcircuits to a common "and" gate. The common "and" gate may be provided, for example, by three transistors in series. The base of each of the transistors is connected to the output of one of the count-down subcircuits. The emitters and collectors of those transistors are connected in series. Only in the presence of a simultaneous output pulse from all of the count-down subcircuits does there occur an output pulse from the "and" circuit. The subcircuits are arranged to have time periods which are relatively prime integers of each other in relationship to the output of the time base. For example, the subcircuits have division ratios of 5:1, 6:1 and 7:1. These subcircuits provide a count-down output which is a multiple of their divisional ratios, that is, the frequency division is $5\times6\times7$, or 210. In the example mentioned, the division of 10,080 Hz. by 210 provides the output of 48 Hz. Preferably, each of the subcircuits is a relaxation oscillator utilizing complementary transistors. The transistors are one of one type, for example PNP, and two of its opposite type, NPN. This circuit is relatively temperature stable and may be produced by relatively inexpensive integration techniques in a small size which may be utilized in a watch.

The count-down subcircuits of the present invention utilize relatively small components and particularly relatively small capacitors and resistors compared to the components which would necessarily be used in a direct series of tandem connected divider subcircuits. The size of the timing components, i.e., capacitors and resistors, is directly related to the frequency of their timing. Consequently, serial dividers have relatively long time periods, i.e., the output divider requires large components.

Other objectives of the present invention will be apparent from the preferred embodiment described in detail below, taken in conjunction with the accompanying drawings.

Figure 1:
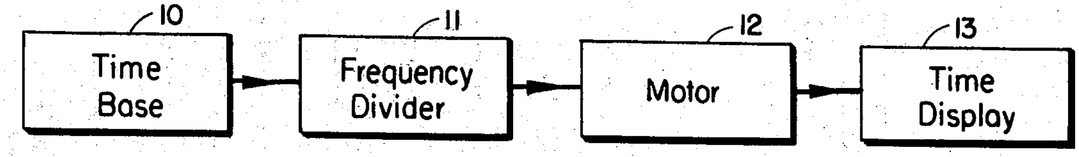
FIG. 1 is a block diagram showing the overall circuit of an electronic watch.

The system of the electronic watch of the present invention is shown in FIG. 1. In that figure, the time base 10 is a high-frequency oscillator which is accurate over a relatively long time period and which maintains the same frequency regardless of the physical position of the watch. Preferably the time base 10 is a piezoelectric electronic crystal oscillator utilizing transistors and a piezoelectric crystal as its active components. The frequency of the time base 10 is, for example, 10,080 Hz. Higher frequencies, however, may be used—and, indeed, are desirable—as the crystal may be made small and could utilize less energy. The output frequency of the time base 10 is commutated to the frequency divider 11 and is seen as a synchronization pulse by the frequency divider 11. Frequency divider 11, which will be explained in detail below, divides the frequency by a predetermined accurate ratio, for example, it divides the frequency of 10,080 Hz. by 210 to produce output pulses at 48 Hz. The output of frequency divider 11 is commutated to the motor 12. The motor 12 converts the electrical energy, at 48 Hz., to a usable rotary mechanical energy and to drive the gear train of the watch. The gear train may be as in a conventional watch. Alternatively, the pulses, at 48 Hz., may be utilized to synchronize an electric or an electronic watch movement operating at a frequency less than 48 Hz., provided that the operating frequency is an exact submultiple of 48 Hz. The display 13 is preferably of a conventional type or may be an electro-optical time display. It has rotatable hands which are centrally mounted in relationship to a watch dial. Other types, however, of time display means may be used, including electro-optical displays.

Figures 2, 3:
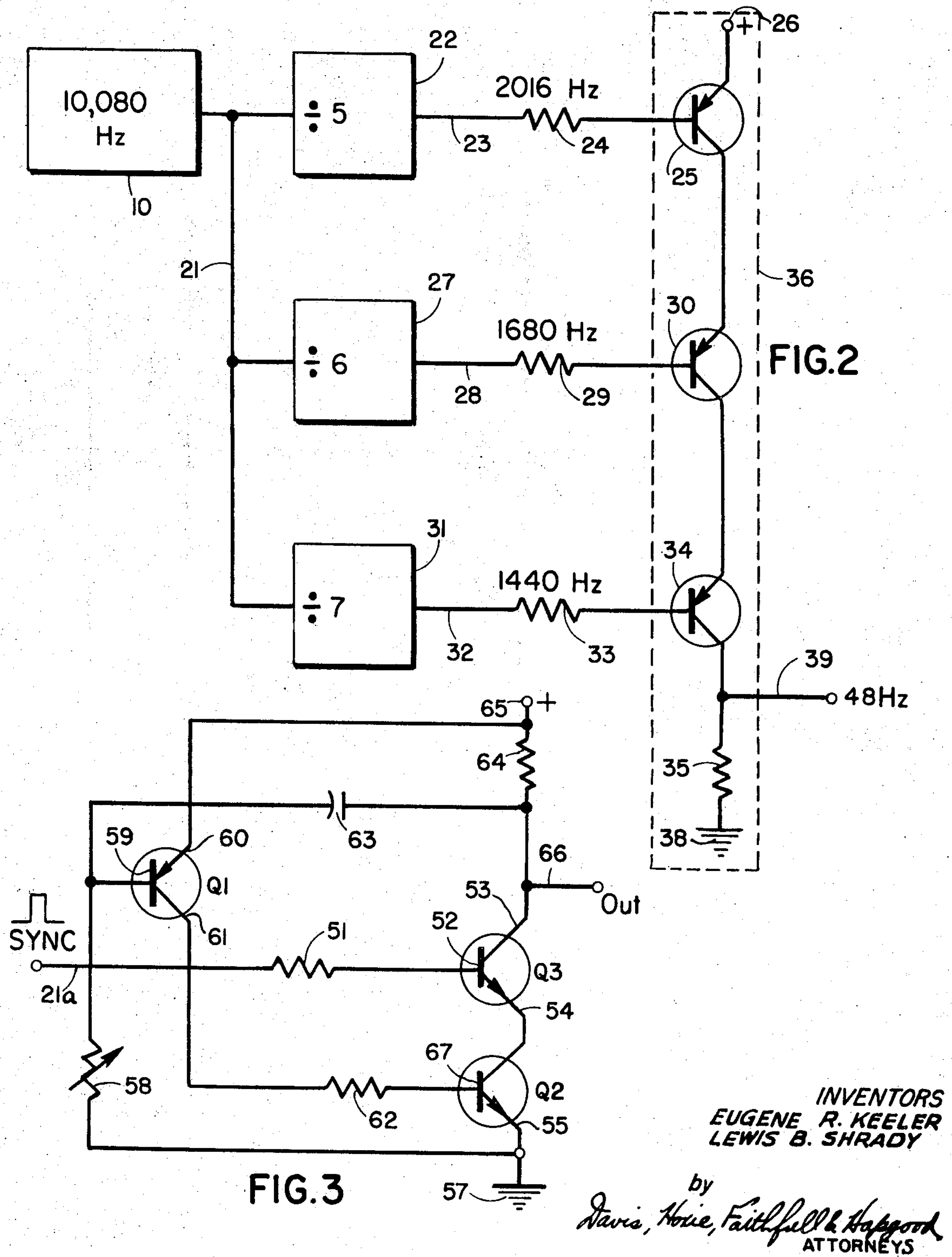
FIG. 2 is a block schematic diagram showing the count-down circuit of the present invention.
FIG. 3 is a schematic diagram showing the relaxation oscillator which is preferably utilized as each of the count-down subcircuits.

The frequency divider 11 is shown in detail in FIG. 2. The time base 10, which is a piezoelectric oscillator, produces a frequency of 10,080 Hz. The output of the time base 10 is connected to line 21, which serves as the input to the individual count-down subcircuits 22, 27 and 31. Each of the count-down circuits 22, 27 and 31 divide by relatively prime integers, for example, the ratios 5:1, 6:1, 7:1. As another example, the ratios may be 3:1, 4:1, 5:1 and 7:1, which produces a division of $3\times4\times5\times7$, or 420. The outputs of the dividers 22, 27 and 31 are on lines 23, 28 and 32 respectively. In the given example, the respective divisions are of the frequency of 10,080 Hz. are 2,016 Hz., 1,680 Hz. and 1,440 Hz., respectively. The output of count-down subcircuit 22 is taken from resistor 24 to the base of a PNP transistor 25. The current for the operation of transistor 25 is taken from positive current source 26 which is preferably the positive terminal of the battery cell enclosed within the watch. As shown, the positive source 26 is connected to the emitter of transistor 25. Similarly, the output line 28 of count-down circuit 27 is connected to the base of transistor 30 and the output line 32 of count-down circuit 31 is connected to the base of transistor 34. The emitters and collectors of transistors 25, 30 and 34 are connected in series. This series of transistors provides an "and" gate 36. An output pulse will occur at the collector of transistor 34 on line 39 only when there is an exactly simultaneous and coincident pulse at the bases of the transistors 25, 30 and 34. For example, if a pulse occurs on line 23 without simultaneous pulses on lines 28 and 32, there will be no output pulse on line 39. The collector of transistor 34 is also connected in series with resistor 35 and ground termination 38.

The detailed circuit for each of the count-down circuits 22, 27 and 31 is shown in FIG. 3. In FIG. 3 the synchronization pulse is on input line 21*a*. Line 21*a* is connected through resistor 51 to the base 52 of transistor Q3. The emitter of transistor Q3, which is an NPN transistor, is connected to the collector of NPN transistor Q2. The emitter 55 of transistor Q2 is connected through variable resistor 58 to the base 59 of PNP transistor Q1. The emitter 55 is also connected to ground 57. The collector 61 of transistor Q1 is connected through resistor 62 to the base 67 of transistor Q2. The emitter 60 of transistor Q1 is connected to the positive source of current 65, which preferably is the positive terminal of the battery cell within the watch. The positive source 65 is also connected to one terminal of resistor 64, whose other terminal is connected to the collector 53 of transistor Q3 and also to one side of capacitor 63, whose other side is connected to the base 59 of transistor Q1. The output line 66, which may be outputs 23, 28 or 32 of FIG. 2, are connected to the collector 53 of the transistor Q3. Preferably, the subcircuits 22, 27 and 31 are manufactured exactly alike. The only difference is the value of the variable resistor 58. Modern integrating circuit techniques now permit PNP and NPN transistors to be formed on the same silicon wafer; that is, with the exception of capacitor 63 and resistor 58, the subcircuits 22, 27 and 31 may be formed by integrated circuit techniques on the same silicon wafer. In the example given, in which the crystal oscillator is at 10,080 Hz., the stages of the subcircuits 22, 27 and 31 have time constants of 450 microseconds for subcircuit 22, 550 microseconds for subcircuit 27, and 650 microseconds for subcircuit 31.

In contrast, if the same division were to be accomplished by three similar stages in tandem, it would require division of ratios of 6:1, 6:1 and 6:1, that is, $6\times6\times6$. The time constants of these stages would be approximately the first of 700 microseconds, the second of 4.2 milliseconds, and the third of 25 milliseconds. Particularly, the second and third stages would require considerably larger timing components.

An example of suitable circuit values are as follows: capacitor 63 of 200 pf., resistor 51 of 33K ohms, resistor 62 of 100K ohms, variable resistor 58 of 5 megohms, resistor 64 of 100K ohms, and power source 65 of +1.5 volts.

In operation, transistor Q3 closes the regenerative loop only when a sync pulse on line 21*a* is present. With voltage, from source 65, applied to the circuit, transistor Q1 turns on supplying, by its collector 61, base current to transistor Q2. The collector 54 of transistor Q2 becomes at virtually ground potential. Upon application of a sync pulse, on line 21, transistor Q3 turns on charging capacitor 63 through the base-emitter junction of transistor Q1 and the saturation resistance of transistors Q2 and Q3. At the trailing edge of the sync pulse, transistor Q3 turns off, causing the voltage at the base 59 of transistor Q1 to go positive, cutting transistor Q1 off. When transistor Q1 turns off, it turns transistor Q2 off. With transistors Q1 and Q2 off, capacitor 63 discharges through resistors 64 and 58. When the voltage at the base of transistor Q1 enables that transistor to turn on, the circuit is primed and will fire on the next applied sync pulse on line 21. Any sync pulse arriving prior to the turning on of transistor Q1 will not have any effect on the circuit.

Since the transistors are normally off, the average current is extremely small. With 2 microsecond sync pulses at a 10 kHz. rate, the circuit draws less than 1.0 microampere. The synchronizing transistor need not be placed as shown in FIG. 3 but can be situated anywhere that will open the loop.

We claim:

1. An electronic horological instrument including terminals adapted to be connected to a source of electrical current, a high-frequency time base connected to said source, a frequency divider connected to said source and said time base and time-display means connected to said divider, wherein said frequency divider consists of an "and" circuit and at least three frequency count-down subcircuits, each of which count-down subcircuits has a dividing ratio which is a relatively prime integer of each other subcircuit, each of said subcircuits being connected to a common output of said time base and each of said subcircuits being connected to the "and" circuit to provide an output of said "and" circuit only with simultaneous outputs of said count-down subcircuits.

2. An instrument as in claim 1 wherein each count-down subcircuit is a relaxation oscillator utilizing a pair of complementary transistors and having a third transistor utilized for application of the synchronization pulses.

3. An instrument as in claim 2 wherein the collector-emitter paths of the output transistor of the relaxation oscillator and the synchronizing transistor are in series with the power source and the synchronizing pulse is applied to the base of the synchronizing transistor.

References Cited

UNITED STATES PATENTS

| | | | |
|---|---|---|---|
| 3,009,089 | 11/1961 | Collins | 318—329 |
| 3,485,033 | 12/1969 | Langley | 58—23 |

RICHARD B. WILKINSON, Primary Examiner

E. C. SIMMONS, Assistant Examiner

U.S. Cl. X.R.

307—225